US011000016B2

(12) United States Patent
Lawlor

(10) Patent No.: US 11,000,016 B2
(45) Date of Patent: May 11, 2021

(54) EDIBLE PET CHEW AND METHOD OF PREPARING

(71) Applicant: DOSKOCIL MANUFACTURING COMPANY, INC., Arlington, TX (US)

(72) Inventor: Anthony Lawlor, New Haven, CT (US)

(73) Assignee: DOSKOCIL MANUFACTURING COMPANY, INC., Arlington, TX (US)

( * ) Notice: Subject to any disclaimer, the term of this patent is extended or adjusted under 35 U.S.C. 154(b) by 0 days.

(21) Appl. No.: 16/250,406

(22) Filed: Jan. 17, 2019

(65) Prior Publication Data
US 2020/0229398 A1   Jul. 23, 2020

(51) Int. Cl.
| | | |
|---|---|---|
| *A01K 15/02* | (2006.01) | |
| *A23K 50/42* | (2016.01) | |
| *A23K 40/25* | (2016.01) | |
| *A23P 30/40* | (2016.01) | |
| *A23P 30/20* | (2016.01) | |
| *A23K 40/20* | (2016.01) | |
| *A23K 10/30* | (2016.01) | |

(52) U.S. Cl.
CPC ............ *A01K 15/026* (2013.01); *A23K 40/25* (2016.05); *A23K 50/42* (2016.05); *A23P 30/20* (2016.08); *A23P 30/40* (2016.08); *A23K 10/30* (2016.05); *A23K 40/20* (2016.05)

(58) Field of Classification Search
CPC .... A01K 15/025; A01K 15/026; A23K 10/26; A23K 10/28; A23K 40/10; A23K 40/20; A23K 40/25; A23K 50/40; A23K 50/42; A23K 10/20; A23P 30/20; A23P 30/30; A23P 30/32; A23P 30/34; A23P 30/40
USPC .................................................. 119/709, 710
See application file for complete search history.

(56) References Cited

U.S. PATENT DOCUMENTS

| | | | | |
|---|---|---|---|---|
| 4,190,679 | A * | 2/1980 | Coffee ................... | A23K 40/20 426/335 |
| 4,702,929 | A * | 10/1987 | Lehn ...................... | A23K 40/20 426/635 |
| 5,240,720 | A | 8/1993 | Axelrod | |
| 5,476,069 | A * | 12/1995 | Axelrod ............... | A01K 15/026 119/709 |
| 5,635,237 | A * | 6/1997 | Greenberg ............. | A23K 40/20 426/284 |
| 5,786,382 | A * | 7/1998 | Childers-Zadah ..... | A01N 65/08 424/733 |
| 6,086,940 | A | 7/2000 | Axelrod | |
| 6,178,922 | B1 * | 1/2001 | Denesuk ............. | A01K 1/0152 119/710 |
| 6,223,693 | B1 * | 5/2001 | Perlberg ............... | A01K 15/026 119/707 |
| 6,379,725 | B1 | 4/2002 | Wang et al. | |
| 6,827,041 | B2 * | 12/2004 | Hague .................... | A23K 50/42 119/709 |
| 7,107,938 | B2 * | 9/2006 | Brown ................. | A01K 15/026 119/710 |
| 7,147,888 | B2 * | 12/2006 | Brown .................. | A23K 40/30 426/89 |
| 7,691,426 | B2 | 4/2010 | Axelrod et al. | |
| 7,976,884 | B2 * | 7/2011 | Weinberg ............. | A01K 15/026 426/106 |
| 8,057,838 | B2 * | 11/2011 | Levin ...................... | A23L 13/20 426/641 |
| 8,215,627 | B2 * | 7/2012 | Hayashi ................... | B42C 1/12 270/32 |
| 8,479,687 | B2 * | 7/2013 | Anderson ............ | A01K 15/026 119/709 |
| 8,613,261 | B2 | 12/2013 | Mendal | |
| 9,044,039 | B2 | 6/2015 | Xu | |
| 9,770,044 | B2 | 9/2017 | Xu | |
| 2002/0185084 | A1 * | 12/2002 | Sherrill ................ | A01K 15/026 119/710 |
| 2004/0187794 | A1 * | 9/2004 | Nakata ................... | A23K 40/20 119/709 |
| 2005/0013899 | A1 * | 1/2005 | Kostlan ................ | A01K 5/0114 426/2 |
| 2005/0064019 | A1 * | 3/2005 | Hill ........................ | A23K 10/26 424/442 |
| 2005/0074541 | A1 * | 4/2005 | Tsengas ................. | A23K 50/40 426/658 |
| 2005/0217604 | A1 | 10/2005 | Brown | |
| 2006/0027184 | A1 * | 2/2006 | Renzi ................... | A01K 15/026 119/710 |
| 2006/0188611 | A1 | 8/2006 | Unlu | |
| 2008/0185746 | A1 * | 8/2008 | Axelrod ............... | A01K 15/026 264/37.27 |
| 2010/0003393 | A1 | 1/2010 | Torney | |
| 2010/0183523 | A1 * | 7/2010 | Wagner .................. | A23K 10/30 424/50 |
| 2011/0253062 | A1 * | 10/2011 | Adkins .................. | A23K 10/26 119/710 |
| 2011/0283955 | A1 * | 11/2011 | Axelrod ................ | A23K 10/20 119/710 |
| 2012/0055417 | A1 | 3/2012 | Ding | |
| 2013/0052306 | A1 * | 2/2013 | Carrillo ................ | A01K 15/026 426/92 |

(Continued)

FOREIGN PATENT DOCUMENTS

WO      2016/083947 A1    6/2016

OTHER PUBLICATIONS

International Search Report and Written Opinion of corresponding International Patent Application No. PCT/US2020/013465 dated Mar. 17, 2020.

*Primary Examiner* — Drew E Becker
*Assistant Examiner* — Bryan Kim
(74) *Attorney, Agent, or Firm* — Global IP Counselors, LLP

(57) ABSTRACT

An edible pet chew is made from processed rawhide and water comprising protein in the range of about 55 to 80 wt. %; fat in the range of about 1 to 5 wt. %; and water content in the range of about 10 to 30 wt. %. Optionally, the chew contains edible glycerin in the range of about 3 to 8 wt. %. The product is pliable and has a density of less than about 1.0 g/cc.

5 Claims, No Drawings

(56) References Cited

U.S. PATENT DOCUMENTS

| | | | |
|---|---|---|---|
| 2014/0113032 A1* | 4/2014 | Reiser | A23K 40/20 426/72 |
| 2015/0147454 A1* | 5/2015 | Russell-Maynard | A23K 10/26 426/576 |
| 2015/0374014 A1* | 12/2015 | Gumudavelli | A23K 40/00 426/2 |
| 2016/0015001 A1* | 1/2016 | Ming Yun | A23K 40/20 426/646 |
| 2016/0143320 A1* | 5/2016 | Mahe | A23K 50/42 426/2 |
| 2018/0177156 A1 | 6/2018 | Heath et al. | |

* cited by examiner

EDIBLE PET CHEW AND METHOD OF PREPARING

CROSS-REFERENCE TO RELATED APPLICATIONS

Not Applicable.

STATEMENT REGARDING FEDERALLY SPONSORED RESEARCH

Not Applicable.

APPENDIX

Not Applicable.

BACKGROUND OF THE INVENTION

Field of the Invention

The present invention relates to edible pet chews. More specifically, the present invention relates to edible pet chews made of rawhide which are dairy-free, gluten-free, high protein, low density and pliable.

Related Art

The typical rawhide chew is difficult to chew and requires a length of time to be consumed. In the process, the chew is wet and messy, and often left half eaten on the floor. The half-eaten chew can stain carpet, smell bad and is unfavorable to look at. There has been a desire for an edible rawhide chew that is gluten-free, dairy-free, filler-free, high protein, low density and pliable. The low density and resiliency provide a product that the pet can bite through and chew. Its texture does not require the excessive chewing of typical rawhide chew to get a bite to swallow. There have been a number of patents directed to improved rawhide-containing edible chews, but none have the desirable properties provided by the product and the claimed method of this patent. Additionally, no strong chemicals are used in the method to prepare this product.

U.S. Pat. No. 7,691,426 discloses a method of forming an animal chew comprising processed rawhide and an edible resin composition. The processed rawhide is hide removed from the animal that is bleached or treated to remove hair. The edible resin composition can include starch, gluten, vegetable based protein, carbohydrate or fat based product and glycerin. The processed rawhide can be chopped or ground into small particles or powder. The particle size may be less than about 10 mm. The combined processed rawhide and resin composition are extruded to form a selected shape.

Patent publication US2012/0055417 describes a collagen fiber reconstituted rawhide useful in the production of pet chews, and a method for making the same. Beginning materials include animal skins with hair, depilated limed splits and leftovers from the manufacture of rawhide pet chews. The materials are pretreated, ground, subjected to acid treatment to swell and separate the collagen fibers that comprise the animal hide, further ground into pulp, vacuum filtered, mixed with a dehydration agent that chemically shrinks the expanded fibers, drained, formed and dried into sheet and finally exposed to a cross-linking agent to increase the adhesive strength of the end product.

SUMMARY OF THE INVENTION

An edible pet chew is made from rawhide comprising protein in the range of about 55 to 80 wt. %. In a preferred embodiment, the protein content is greater than or equal to about 70 wt. %. The chew contains fat in the range of about 1 to 5 wt. %. In a preferred embodiment, the fat content is greater than or equal to about 2.5 wt. %. The chew contains water content in the range of about 10 to 30 wt. %. In a preferred embodiment, the water content is less than or equal to about 20.0 wt. %. The chew contains edible glycerin in the range of about 3 to 8 wt. %. Preferably, the glycerin content is 5%. The product is pliable and has a density of less than about 1.0 g/cc.

A process of making an edible pet chew is heating a mixture of rawhide, water and glycerin at a temperature of from about 80 to 100° C. for a period of from about 20 to 30 min. to provide a cooked rawhide; mincing the cooked rawhide to provide a minced rawhide of particle size from about 3 mm to 8 mm; whipping the minced rawhide with air for from about 5 to 15 min. to form a whipped mixture; heating the whipped mixture to a temperature in the range of from about 80 to 95° C. for about 3 to 5 min in an extruder with one extruder die at about 11 mm to 17 mm in diameter and the second die at about 6 mm to 11 mm in diameter to provide an extruded product; drying the extruded product at a temperature of from about 45° C. to about 80° C. from about 10 to 36 hours to form a pet chew. The pet chew is high protein, gluten-free, dairy-free, filler-free, low density and pliable.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

DETAILED DESCRIPTION OF THE PREFERRED EMBODIMENTS

The following description of the preferred embodiment(s) is merely exemplary in nature and is in no way intended to limit the invention, its application, or uses.

The rawhide used in the present invention is the byproduct of the slaughter of hoofed animals and consists of the hide, tendons, etc. The dry material is largely made up of fibrous proteins, collagen, keratin, elastin and reticulin. Typically cow rawhide is used. Pig rawhide is not suitable for the present invention, as the product proved to be greasy and rancid. To form rawhide, a cow or other animal hide is split. The top grain is generally tanned and formed into leather products. The bottom half of the hide is generally kept in its natural "raw" state. Hides in such natural, untanned state, are generally referred to as rawhide. One common use for rawhide is the production of chemicals such as gelatin. Another important use for rawhide is the manufacture of edible chew toys for pets, such as dogs.

Preferably, the rawhide used in the present invention is processed by bleaching. This rawhide can be washed, delimed, treated with hydrogen peroxide and dewatered.

The processed rawhide is cooked with water at a temperature of from about 80 to 100° C. for a period of from about 20 to 30 min. to provide a cooked rawhide. Preferably, the water is heated to 100° C. In a preferred embodiment, the rawhide is cut into pieces suitable for fitting into the cooking vessel and is cooked with an equal volume of water. Preferably, edible glycerin is added to the water and rawhide, such as vegetable glycerin or coconut glycerin. The preferred glycerin is coconut glycerin, which seems to be preferred by dogs. Edible glycerin is added to provide the product with glycerin in the range of about 3 to 8 wt. %. Preferably, the glycerin content of the product is 5 wt. %.

In addition to the water and glycerin, flavorings can be added to rawhide when cooking, such as bacon, peanut butter, cheese, vanilla or liver flavorings.

The cooked rawhide is minced to provide a minced rawhide of particle size from about 3 mm to 8 mm. The mincing provides a much finer, softer output than a typical grinding operation. Preferably a mincing head is used, which includes an attachment flange for attaching to a mincing machine. A typical model is JR120 produced by Yuanchang. In a preferred embodiment the particle size is about 5 mm. It also important to note that the rawhide must be cooked before mincing to get the desired texture of product. If the steps are reversed, an unfavorable product is made.

The minced rawhide is whipped using a high speed mixer. Preferably a Mixer BDJ-50 is used at a speed in the range from 108 rpm to 260 rpm for a period of from about 5 to 15 minutes. A more preferred mixing speed is from 120 to 100 rpm. This step, following mincing, provides the desired low density, light texture that is desirable for the product.

The whipped product is fed into an extruded at a temperature in the range of from about 80 to 95° C. for about 3 to 5 min in an extruder to provide an extruded product. The extruder settings are 80 to 95° C. with die sizes 6-11 mm and 11-17 mm. The product can be extruded in any desired shape or combination of shapes. However, the preferred shape is about a 0.5 inch diameter stick.

The final step is the heated air drying step. This step is critical to achieving the product with the desired properties. The extruded product is dried using heated air at a temperature of from about 45° C. to about 80° C. from about 10 to 36 hours to form a pet chew. Preferably the extruded product is heated at about 60° C. for about 15 hours. Preferably, the product is placed on trays under a blanket of hot air. If the extruded product is simply left to air dry at room temperature, an unacceptable product is made.

The edible pet chew of the present invention is gluten-free, dairy-free and filler-free. That means that no gluten-containing products are added, no dairy or casein products are added, and no plant or other fillers are added.

EXAMPLES OF THE INVENTION

Below please find Controls 1-5 and Example 1 of the present invention. The conditions for the cooking step, the mincing step and the extruding step fell within the guidelines given above.

Control 1

1. Ground the rawhide
2. Cooked the rawhide, water, glycerin and flavors.
3. Extruded the cooked rawhide
4. Room Air dried This method did not get the desired result.

Control 2

1. Ground the rawhide
2. Cooked the rawhide, water, glycerin and flavors.
3. Extruded the cooked rawhide
4. Hot Air dried This method did not get the desired result.

Control 3

1. Cut the rawhide in strips
2. Cooked the rawhide, water, glycerin and flavors

3. Minced the cooked rawhide
4. Extruded the minced Rawhide
5. Room Air dried the Rawhide This method did not get the desired result.

Control 4

1. Cut the rawhide in strips
2. Cooked the rawhide, water, glycerin and flavors
3. Minced the cooked rawhide
4. Extruded the minced Rawhide
5. Hot Air dried the Rawhide This method did not get the desired result.

Control 5

1. Cut the rawhide in strips
2. Cooked the rawhide, water, glycerin and flavors
3. Minced the cooked rawhide
4. Whipped the minced rawhide
5. Extruded the whipped Rawhide
6. Room Air dried the Rawhide This method did not get the desired result.

Example 1

1. Cut the rawhide in strips
2. Cooked the rawhide, water, glycerin and flavors
3. Minced the cooked rawhide
4. Whipped the minced rawhide
5. Extruded the whipped Rawhide
6. Hot Air dried the Rawhide to make the product.

This method produced the desired result.

The embodiments were chosen and described to best explain the principles of the invention and its practical application to persons who are skilled in the art. As various modifications could be made to the exemplary embodiments, as described above with reference to the corresponding illustrations, without departing from the scope of the invention, it is intended that all matter contained in the foregoing description and shown in the accompanying drawings shall be interpreted as illustrative rather than limiting. Thus, the breadth and scope of the present invention should not be limited by any of the above-described exemplary embodiments, but should be defined only in accordance with the following claims appended hereto and their equivalents.

What is claimed is:

1. A method of preparing an edible pet chew comprising:
heating rawhide and an equal volume of water together in a cooking vessel at a temperature of 80° C. to 100° C. to provide a cooked rawhide;
mincing the cooked rawhide to a particle size of 3 to 8 mm using a mincing machine to provide a minced rawhide;
whipping the minced rawhide in a mixer at a speed of 108 to 260 rpm to provide a whipped mixture;
feeding the whipped mixture into an extruder after said mixture has been whipped and extruding the whipped mixture to provide an extruded product; and
drying the extruded product with heated air to provide said edible pet chew.

2. The method of claim 1, wherein:
the rawhide and water are heated at the temperature of 80° C. to 100° C. for a period of 20 to 30 min. to provide the cooked rawhide;
the minced rawhide is whipped with air for a period of 5 to 15 min. to form the whipped mixture;

the whipped mixture is extruded at a temperature in the range of 80° C. to 95° C. for 3 to 5 min. to make the extruded product; and the extruded product is dried at a temperature of 45° C. to 80° C. for 24 to 36 hours to form the edible pet chew;

wherein the edible pet chew is pliable and has a density of less than 1.0 g/cc.

3. The method of claim 2, wherein 3 to 8 wt. % glycerin is heated with the rawhide and water.

4. The method of claim 3, wherein the pet chew is gluten-free and dairy-free.

5. The method of claim 1, wherein the edible pet chew is pliable.

\* \* \* \* \*